United States Patent [19]

Barnes et al.

[11] 4,406,201

[45] Sep. 27, 1983

[54] FABRIC CUTTING

[75] Inventors: Thomas E. Barnes, Bloomington, Ind.; Clifford A. Landsness, Akron, Ohio

[73] Assignee: The B. F. Goodrich Company, New York, N.Y.

[21] Appl. No.: 295,357

[22] Filed: Aug. 24, 1981

[51] Int. Cl.³ .......................... B26D 1/18; B26D 1/20
[52] U.S. Cl. ....................................... 83/487; 83/508; 83/675
[58] Field of Search ...................... 83/508, 486, 486.1, 83/488, 676, 675, 349, 331–333, 500–502, 487; 30/347

[56] References Cited

U.S. PATENT DOCUMENTS

| 371,961 | 10/1887 | Mason | 83/508 X |
|---|---|---|---|
| 692,155 | 1/1902 | Langston | 83/675 X |
| 737,758 | 9/1903 | Miller | 83/508 X |
| 1,123,532 | 1/1915 | Heynau | 83/676 |
| 1,735,520 | 11/1929 | Williams | 83/508 X |
| 2,219,485 | 10/1940 | Neuwirth | 83/508 X |
| 3,387,524 | 6/1968 | Huck | 83/675 X |
| 3,465,631 | 9/1969 | Reeder, Jr. | 83/676 X |
| 4,069,729 | 1/1978 | Kuts | 83/508 X |
| 4,275,630 | 6/1981 | Goldsmith et al. | 83/500 |

Primary Examiner—Frank T. Yost
Attorney, Agent, or Firm—Joseph Januszkiewicz

[57] ABSTRACT

A cutter apparatus for cutting of rubberized fabric material having high strength material embedded therein, wherein a carriage is reciprocated on a support frame. A cutter support is mounted on the carriage for movement therewith. Such cutter support journals for rotation a shaft that supports on one end a rotatable cutter. The cutter cooperates with a linear cutting edge of an anvil carried by the cutter support to shear the fabric material. A guide is mounted on the frame over which the fabric material travels and under which a conveyor belt move, which belt transports the fabric material. The rotatable cutter has a concave groove on one side surface adjacent the outer periphery and a concave groove on the circumferentially extending surface that joins the respective side surfaces. The grooves define a circular cutting edge.

3 Claims, 6 Drawing Figures

FABRIC CUTTING

BACKGROUND OF THE INVENTION

This invention relates to pneumatic tire manufacture and more particularly to a cutting apparatus for cutting ply stock material which is employed in the construction and manufacture of pneumatic tires.

In the manufacture of pneumatic tires, one of the principal materials used to build the tire carcass is a thin sheet of uncured rubber-like material known as a fabric, building ply or ply stock. In the manufacture of such ply stock, parallel cords of fabric, wire cord or high strength cord such as Kevlar cord are passed through a pair of rolls in cooperation with calendering rolls which work and calendar unvulcanized rubber onto the parallel cords as they pass through the pinch rolls to form a continuous sheet of material with the parallel strands of cord embedded therein and running in a direction that is parallel to the longitudinal centerline of the material. Thereafter, such sheet material is cut into sections of fabric which sections may have the cords at a bias angle relative to the cut edge. The cut sections are then spliced together to make a building ply or ply stock with cords therein located at a desired angle relative to the longitudinal centerline of the ply stock. Such stock or ply stock may also be at a ninety degree angle to the longitudinal centerline of the ply stock formed; however, for purpose of this description and example, the invention will be described wherein the cords are at some small acute angle relative to the longitudinal centerline of the ply stock. Layers of ply stock are applied to a tire building drum in such a manner that cord members of overlapping plies crisscross with respect to the cord members above or below. The tire beads are then set against the ends of the ply stock and the plies are turned thereover. Additional plies, chafer strips, sidewall strips, breakers, overhead belts and a tread ply may be applied in varying orders, and stitched thereto. Such carcass is substantially a cylindrical band. The angle measured between the cords and the circumferential line around the crown of the tire determines the bias angle of the plies. In the case of conventional bias ply pneumatic tires, this may be approximately sixty degrees. However, this apparatus can cut fabric material with strands of steel or Kevlar cord therein which make a small acute angle with the circumferential centerline of the tire. After the removal of such green tire, the tire is given a toroidal shape on a second step machine and then vulcanized. The shaping on the second step machine changes the bias angle. The above description contemplates the use of inextensible or non-extensible cord materials such as nylon, Kevlar cord and wire. In the processing of ply stock containing such inextensible cord, processing is difficult because of the tremendous strength of the material, which cutting is particularly compounded by the very low bias angle cutting on such stock wherein the cutters tend to fray the ends of the Kevlar cord or wire, which action interferes with the splice to be effected. The use of the present apparatus permits the cutting of stock which has a zero bias angle, as where the cords are ninety degree relative to circumferential center line around the crown of the tire.

In bias cutting rubberized fabric, the conventional way of cutting is to use a pair of steel fingers that lift the fabric away from the conveyor belt on which it travels, so that a rapidly rotating cutter disk is above the fingers but is cooperative therewith to cut the fabric. The application of this conventional apparatus to cut rubberized Kevlar and steel cord fabric including fabric for radial tires is difficult and unsatisfactory. The cutter of the present invention is mounted on a carriage and moveable bodily therewith. As the carriage and cutter are moved linearly, the cutter frictionally contacts the material and rolls along cutting the material. The cutter is hollow ground and is cooperative with an anvil also moveable with the carriage. An insert on the anvil has a tapered cutting edge that cooperates with the rolling cutter which has a circular cutting edge, whose edge tapers in a direction that insures a positive shearing action. Upon the completion of a cut across the fabric material, the cutter and anvil are pivoted out of the way so that the cutter and anvil can be returned to their starting position as the fabric material is advanced or indexed in preparation for the succeeding cut.

SUMMARY OF THE INVENTION

The present invention contemplates an apparatus that utilizes a carriage which is mounted on a support frame for reciprocal movement on a guideway. The support frame may be adjusted for the bias angle to be cut, or it may be adjusted for zero bias angle. A cutter support member carrying a cutter and its cooperative anvil is mounted on the carriage for movement therewith. The anvil is supported by the cutter support member in its reciprocal movement. Means are provided to pivot the cutter and the cutter support member along with the anvil out of the way so that as the cutter and anvil can be returned to the original starting position while the fabric material to be cut is indexed in preparation for the next cut. The circular cutter has a continuous circular cutting edge that cooperates with a linear cutting edge of the anvil to provide a shearing action. The respective sides of the circular cutter is hollow ground providing spaced circular cutting edges. The insert on the anvil may be hollow ground to provide a taper and a relief angle.

DETAILED DESCRIPTION

Figure 1:
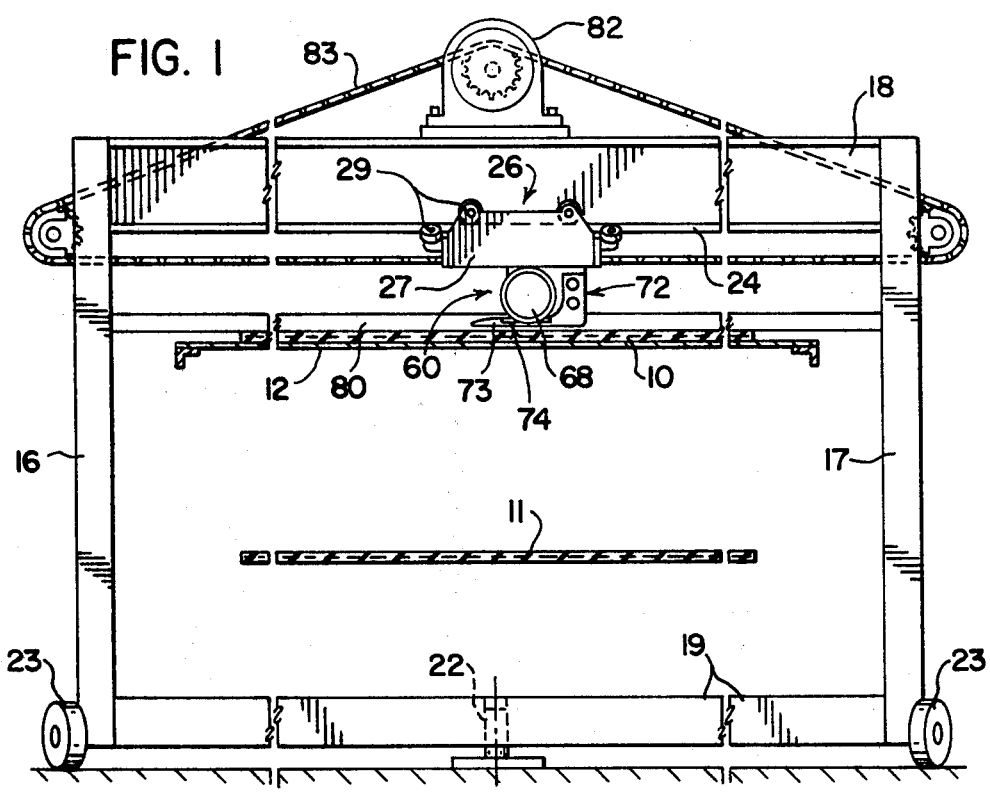
FIG. 1 is a front elevational view of a bias cutting apparatus with a portion of the conveyor shown.
Figure 2:
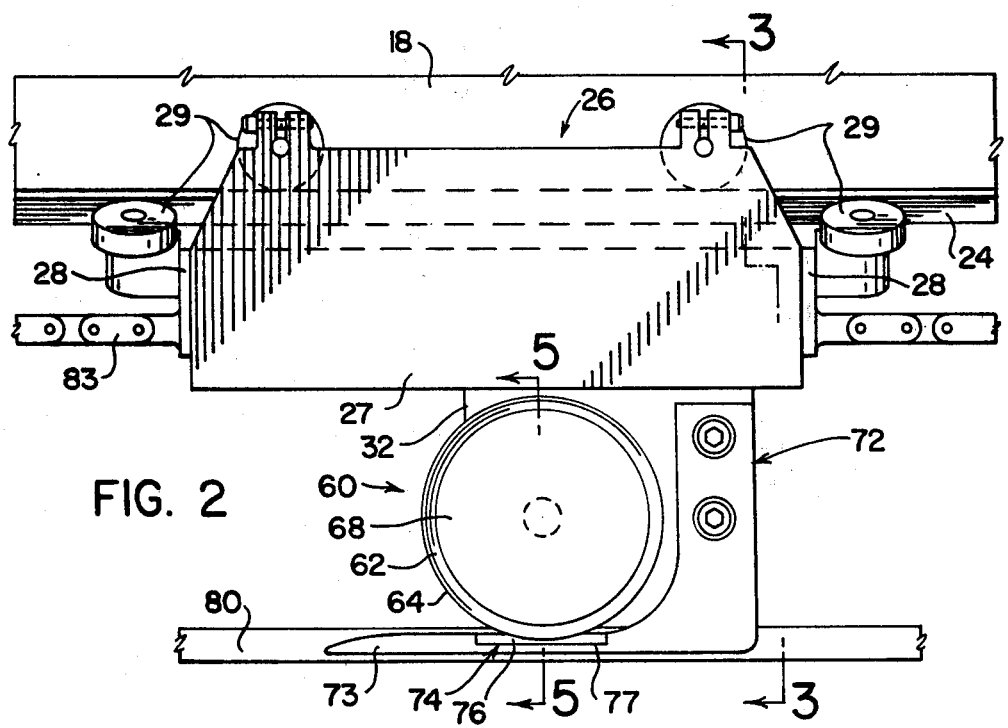
FIG. 2 is an enlarged elevational view of the carriage, cutter support, anvil and a portion of the guide bar.
Figure 3:
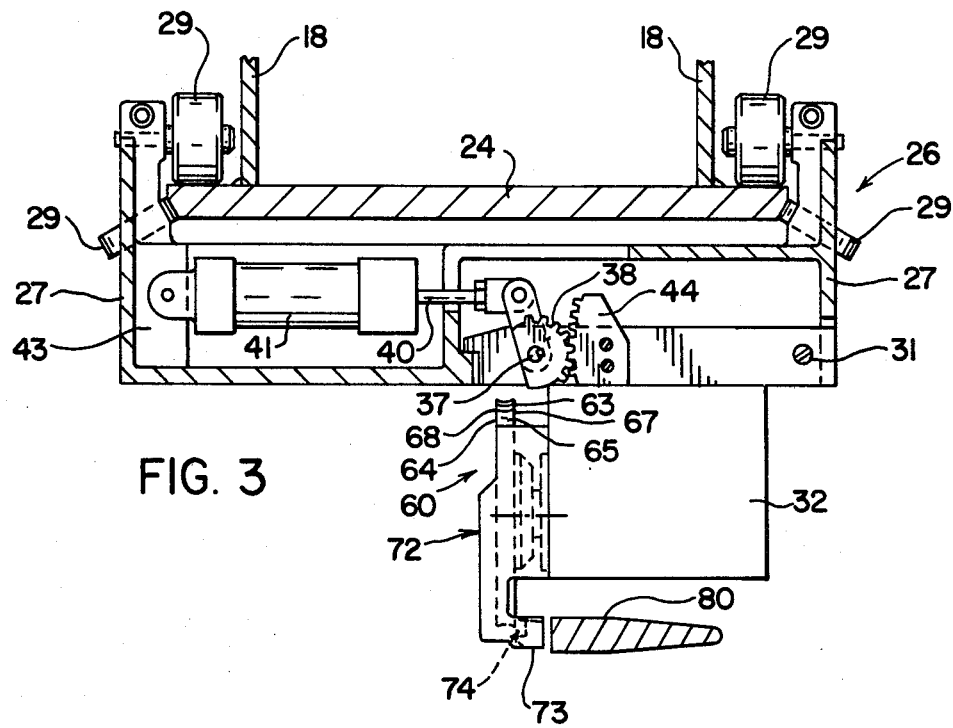
FIG. 3 is a cross-sectional view of the carriage and cutting means taken along lines 3—3 of FIG. 2.
Figure 4:
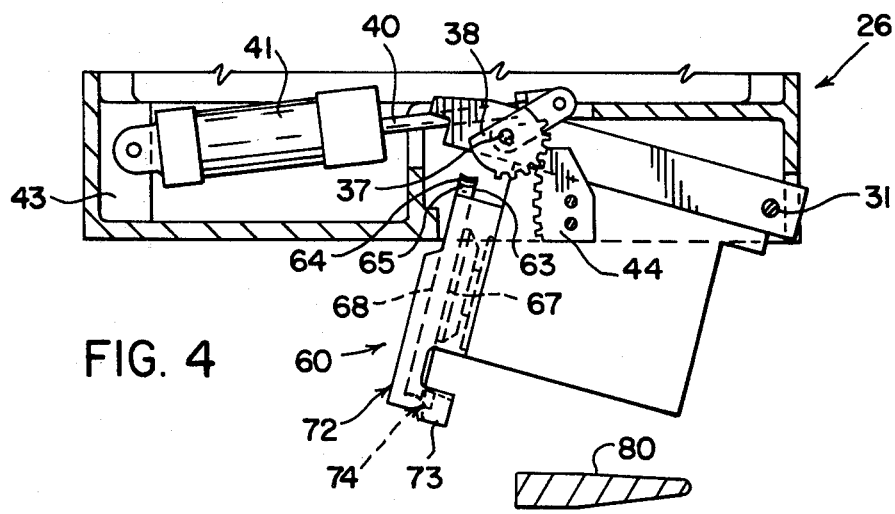
FIG. 4 is a fragmentary cross-sectional view of a portion of the carriage and cutter support showing the cutting support elevated.
Figure 5:
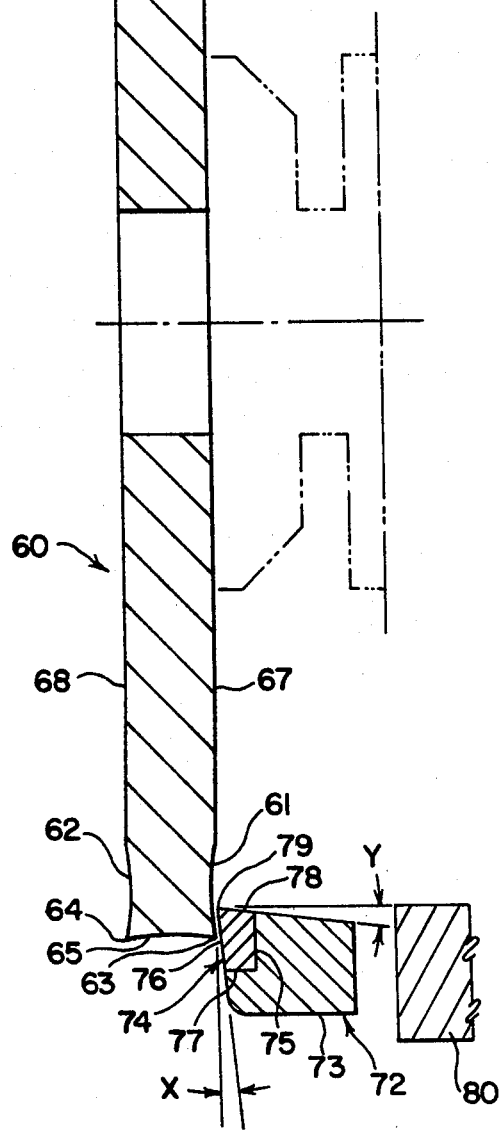
FIG. 5 is a cross-sectional view of the cutter and a portion of the anvil and its insert taken on line 5—5 of FIG. 2.

Referring to the drawings wherein like reference numerals designate like or corresponding parts throughout the several views, there is shown in FIG. 1 an endless conveyor belt that is suitably supported at spaced ends thereof by suitable rollers driven in a manner old and well-known in the art. The conveyor belt has an upper conveying run 10 and a lower return run 11. Suitable guide and support means are provided to guide the belt in its travel, including an upper plate 12 to support upper run 10. Supporting framework shown generally in FIG. 1 includes a pair of spaced upwardly extending support members 16 and 17 with suitable supports including an upper cross support or I-beam 18 and a lower cross support 19. Lower support 19 has a pivot mounting 22 at its intermediate lower portion suitably journaled in the floor of the installation, about which the support framework can be pivotally adjusted. A plurality of spaced rollers 23 are suitably mounted on respective lower end portions of the supporting framework to facilitate the angular adjustment of the supporting frame and the bias cutting apparatus to be described. Cross support members (FIGS. 1 and 3) 18 extend across the entire width of the bias cutting apparatus and support a guideway or guideway member 24 having a plurality of ways thereon. Mounted for reciprocal movement on guideway 24 is a carriage means 26 which includes side plates 27—27 and end plates 28—28 (FIG. 2). Suitably journaled on carriage means 26 are a plurality of rollers 29 which rollingly engage the ways on guideway 24 to maintain carriage means 26 thereon and guide the reciprocal movement of the carriage means 26. Journaled on the lower one end portion of end plates 28—28 of carriage means 26 is a rod or shaft 31 for pivotally supporting a cutter support member 32. Cutter support member 32 has a pair of bosses integral therewith each having aligned bores in which is journaled a shaft 37. Shaft 37 has a pair of spur gears 38 (only one shown) suitably keyed to the respective end portion thereof. Shaft 37 supports a clevis for pivotal attachment to the rod end of piston rod 40 of a pneumatic cylinder 41. The head end of pneumatic cylinder 41 is pivotally attached to a bracket means 43 which is part of the side plate 27 of carriage means 26. The spur gears 38 meshingly engage stationary gear segments 44 (only one shown) that are rigidly secured to the respective end plates 28—28 of carriage means 26. Upon actuation of the head end of cylinder 41, piston rod 40 is extended therefrom to a position shown in FIG. 4 whereby the spur gears 38 rotate clockwise as shown in FIG. 3 pivoting the cutter support member 32 in a clockwise direction (as viewed in FIG. 3) about shaft 31 for a purpose to be described. Journaled for rotation in cutter support member 32 is a circular cutter 60.

Cutter 60 has a pair of spaced parallel side surfaces 67 and 68 that lie in vertical planar surfaces. The outer peripheral portion of each side of cutter 60 is hollow ground presenting a circumferentially extending concave portion 61 on side surface 67 and a circumferentially extending concave portion 62 on side surface 68. The respective outer peripheral edges of side surface 67 and 68 define spaced circumferential cutting edges 63 and 64 with an annular concave groove 65 therebetween.

Suitably secured to the cutter support member 32 is an L-shaped bracket member 72 with its lower end portion having a laterally horizontally extending anvil 73. Anvil 73 is suitably recessed to receive a carbide cutter insert 74 that is located adjacent to the lower portion of cutter 60. In cross-sectional view, insert cutter 74 has a pair of surfaces 75 and 77 at right angles to each other to seat on the recess in anvil 73. Cutter insert 74 has an upper surface 78 that tapers downwardly away from a horizontal plane making an angle Y with the horizontal plane. The top of the anvil also tapers at the same taper as the angle Y and forms a planar surface therewith. The forwardly disposed surface 76 of the cutter insert 74 tapers downwardly and away from the vertical at approximately 2 degrees therefrom. Such taper may be from 1 to 5 degrees. The upper surface 78 of cutter insert 74 makes an acute angle with the front or forwardly disposed surface 76. Angle Y will be in a range between 1 to 6 degrees. Preferably angle Y will be greater than angle X. It should be noted that the taper on cutting insert 74 is in an opposite direction to that taper in cutter 60, thus the adjoining cooperative cutting edges taper away from each other to provide a linear co-action as they shear the cords in the ply stock. A vertical plane passing through the cutting edge 63 of cutter 60 passes or touches the outermost linear cutting edge of insert 74 which is the juncture of surface 78 and 76 defining a linear cutting edge 79. The anvil 73 is moved parallel to the edge of a guide bar 80 over which the fabric material moves while the upper conveying run 10 moves under the guide bar 80.

The intermediate upper portion of I-beam 18, as shown in FIG. 1, supports a variable speed motor 82 having its output connected to a sprocket chain 83 which in turn is connected to carriage 26 and controls the reciprocation of the carriage on the guideway member 24 by suitable controls and limit switches old and well-known in the art.

Figure 6:
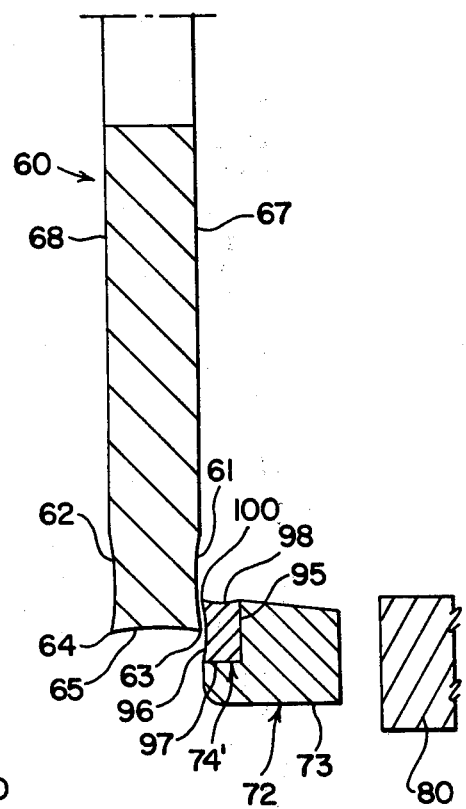
FIG. 6 is an enlarged cross-sectional view of a modified form of cutter and anvil.

A modification to the cutter insert is shown in FIG. 6 wherein the insert 74' has a pair of surfaces 95 and 97 at right angles to each other to seat on the recess in anvil 73. Cutter insert 74' has an upper surface that is hollow ground thereby presenting a concave or elongated groove 98 and a forwardly disposed surface that is hollow ground presenting a concave or elongated groove 96. The juncture of the respective concave grooves 98 and 96 define a linear cutting edge 100 that lines on a plane that touches the circumferential cutting edge 63 of the circular cutter 60. Cutter 60 may be recessed to present cutting edge 64 for cooperative use with linear cutting edge 100.

In the operation of the apparatus described, the fabric material is advanced over the guide bar 80 by the upper conveying run 10 and, after sufficient material has advanced, the conveyor is stopped in preparation for the cutting of the fabric. Upon stopping of the conveyor belt, motor 82 is energized which thereby moves carriage 26 across guide bar 80 while cutter 60 is rotated by its frictional rolling contact with the material that it is cutting. The cooperative cutting edge 63 of the cutter 60 and the cutting edge 100 of the insert 74' or cutting edge 79 of cutter insert 74 performs a snipping or shearing action across the fabric such that the cords embedded in the fabric are cut effectively without fraying the ends thereof as the carriage 26 is moved linearly across the fabric to be cut. Upon completion of the cut, motor 82 is denergized and the head end of cylinder 41 is pressurized, which action rotates the shaft 37 and spur gears 38 which mesh with stationary gear segments 44. Such action causes the gears 38 to roll up the gear segment 44, pivoting the cutter support 32, along with the cutter 60 and anvil 73 out away from the guide bar 80 about shaft 31 to permit the advancement of the fabric material as the carriage 26 is returned to its initial starting position by motor 82 through suitably limit switches and controls old and well-known in the art. Upon return of the carriage to its initial starting position, the rod end of cylinder 41 is pressurized and returns the cutter support member 32 and anvil 73 to the lowered position in preparation for the next succeeding cut.

Various modifications are contemplated and may obviously be resorted to by those skilled in the art without departing from the described invention, as hereinafter defined by the apended claims, as only a preferred embodiment thereof has been disclosed.

We claim:

1. A cutting apparatus for cutting rubberized fabric with cords disposed therein comprising a support frame, a carriage mounted on said support frame for reciprocal movement, drive means connected to said carriage for reciprocating said carriage, a cutter support member mounted on said carriage, a circular cutter means journaled on said cutter support member for rotation thereon, said circular cutter means having a pair of side surfaces, each of said side surfaces having an annular concave groove along the outermost portion defining a pair of spaced circular cutting edges, the outer peripheral surface of said circular cutter between said spaced circular cutting edges is concave, anvil means mounted on said cutter support member for movement therewith, said anvil means having a linear cutting edge cooperative with one of said circular cutting edges for shearing said fabric, said linear cutting edge of said anvil means being defined by the intersection of an anvil upper surface and an anvil forwardly disposed surface, each of which anvil surfaces taper away from said intersection such that said anvil surfaces subtend an acute angle.

2. A cutting apparatus for cutting rubberized fabric as set forth in claim 1 wherein the horizontal plane containing said linear cutting edge of said anvil makes an acute angle with a plane that contains the upper surface of said anvil of between about 1° to 6°.

3. An apparatus for the cutting of elastomeric fabric material comprising a support frame, guide means on said support frame, carriage means mounted for movement on said guide means, power operated means operatively connected to said carriage means for reciprocating said carriage means on said guide means, cutter support means mounted on said carriage means for movement therewith, said cutter support means having a shaft journaled thereon for rotation, a circular cutter means mounted on said shaft for rotation therewith, said cutter means having a pair of spaced substantially parallel side surfaces at least one of said side surfaces has a concave groove around the outermost portion thereof, the outer peripheral surface of said circular cutter between the respective side surfaces has a concave groove to define a pair of circular edges, wherein the juncture of said concave groove of said outer peripheral surface and at least one of said side surfaces having said concave groove around the outermost periphery thereof defines a circular cutting edge, a guide bar secured to the lower portion of said support frame and extending transversely thereacross operative to guide fabric to be cut thereover, anvil means connected to said cutter support means for movement therewith, said anvil having a cutter insert cooperative with said circular cutter means for cutting elastomeric material, said cutter insert having an upper surface and a forwardly disposed surface, said upper and forwardly disposed surfaces of said insert each having a concave groove, whereby the juncture of said grooves on said insert defines a linear cutting edge that is cooperative with said circular cutting edge to provide a shearing action on fabric therebetween.

* * * * *